(12) United States Patent
Boerner et al.

(10) Patent No.: US 9,366,283 B2
(45) Date of Patent: Jun. 14, 2016

(54) BLIND RIVET NUT

(71) Applicant: GESIPA BLINDNIETTECHNIK GMBH, Moerfelden-Walldorf (DE)

(72) Inventors: Ilka Boerner, Moerfelden-Walldorf (DE); Johannes Gross, Moerfelden-Walldorf (DE); Richard Gaertner, Moerfelden-Walldorf (DE)

(73) Assignee: GESIPA BLINDNIETTECHNIK GMBH, Moerfelden-Walldorf (DE)

( * ) Notice: Subject to any disclaimer, the term of this patent is extended or adjusted under 35 U.S.C. 154(b) by 23 days.

(21) Appl. No.: 14/242,458

(22) Filed: Apr. 1, 2014

(65) Prior Publication Data

US 2014/0308090 A1 Oct. 16, 2014

(30) Foreign Application Priority Data

Apr. 16, 2013 (EP) .................................... 13001995

(51) Int. Cl.
*F16B 37/04* (2006.01)
*F16B 37/06* (2006.01)

(52) U.S. Cl.
CPC ......... *F16B 37/067* (2013.01); *Y10T 29/49943* (2015.01)

(58) Field of Classification Search
CPC ............... F16B 37/067; F16B 19/1072; Y10T 24/49943
USPC .................................. 411/183, 55, 60.2, 60.3
See application file for complete search history.

(56) References Cited

U.S. PATENT DOCUMENTS

| | | | | |
|---|---|---|---|---|
| 3,345,900 A * | 10/1967 | Villo | ............................ | 411/41 |
| 3,461,771 A | 8/1969 | Briles | | |
| 3,463,046 A * | 8/1969 | Wendt et al. | .................... | 411/34 |
| 3,789,728 A * | 2/1974 | Shackelford | .................... | 411/34 |
| 3,835,615 A * | 9/1974 | King, Jr. | ........................ | 411/368 |
| 4,177,710 A | 12/1979 | Matuschek et al. | | |
| 5,051,048 A * | 9/1991 | Maddox | .......................... | 411/34 |
| 7,296,957 B2 * | 11/2007 | Walter et al. | .................. | 411/175 |
| 7,713,011 B2 * | 5/2010 | Orszagh et al. | ................. | 411/34 |
| 2005/0095078 A1* | 5/2005 | Makino | ........................... | 411/183 |
| 2006/0228187 A1* | 10/2006 | Sussenbach | ................... | 411/29 |
| 2006/0233642 A1* | 10/2006 | Wunderlich et al. | ........ | 415/209.2 |
| 2006/0291974 A1* | 12/2006 | McGee et al. | ................ | 411/171 |
| 2008/0193256 A1 | 8/2008 | Neri | | |
| 2010/0264722 A1* | 10/2010 | Teixeira, IV | .................... | 301/58 |

FOREIGN PATENT DOCUMENTS

| | | |
|---|---|---|
| DE | 103 42 316 | 4/2005 |
| EP | 0 305 868 | 3/1989 |
| EP | 1 918 596 | 5/2008 |

OTHER PUBLICATIONS

Translation of DE 103 42 316 A1 available at http://worldwide.espacenet.com/publicationDetails.biblio?DB=worldwide.espacenet.com&ll=0&ND=3&adjacent=true&locale=en_EP&FT=D&date=20050421& CC-DE&NR=10342316A1&KC=A1 and http://translationportal.epo.org/emtp/translate/?ACTION=claims-retrieval&COUNTRY=DE&ENGINE=google&FORMAT=docd&KIND=A1& ....*
European Search Report/Office Action conducted in counterpart European Appln. No. 130 01 995.3-1758 (Sep. 4, 2013) (w/ partial English language translation).

* cited by examiner

*Primary Examiner* — Gary Estremsky
(74) *Attorney, Agent, or Firm* — Greenblum & Bernstein, P.L.C.

(57) ABSTRACT

Blind rivet nut with a rivet shank and method for forming blind rivet nut. The blind rivet nut includes a set head, a threaded section having a thread, and a deformation section arranged between the set head and the threaded section, having at least one reinforcement region.

18 Claims, 1 Drawing Sheet

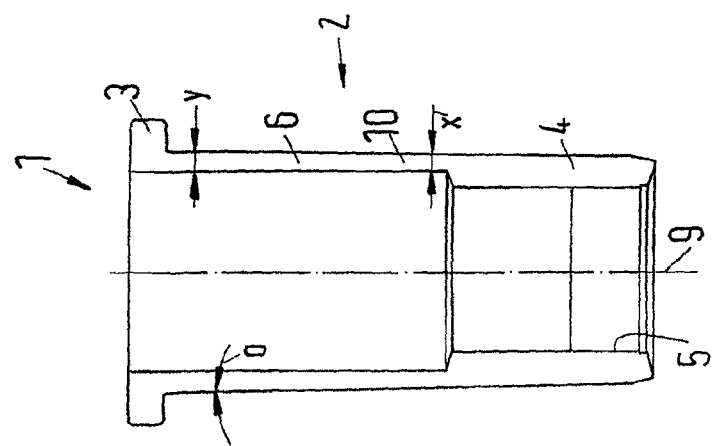
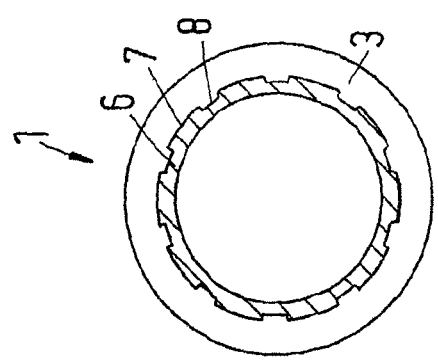
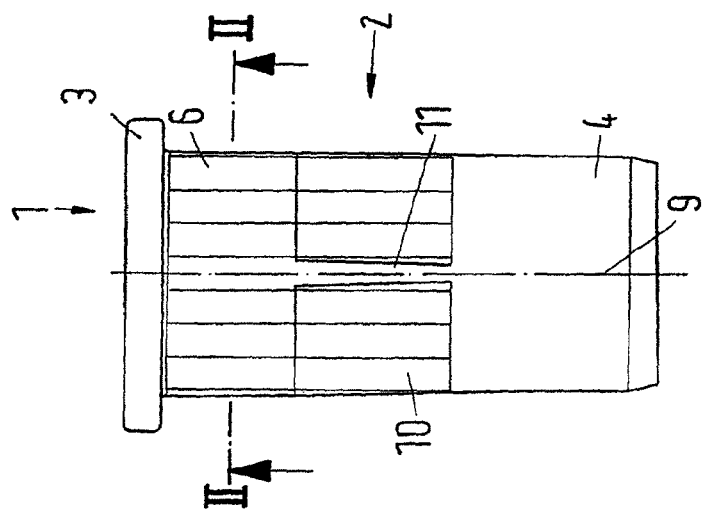

BLIND RIVET NUT

CROSS-REFERENCE TO RELATED APPLICATIONS

The present application claims priority under 35 U.S.C. §119 of European Patent Application No. 13 001 995.3, filed Apr. 16, 2013, the disclosure of which is expressly incorporated by reference herein in its entirety.

BACKGROUND OF THE INVENTION

1. Field of the Invention

Embodiments of the invention relate to a blind rivet nut with a rivet shank that includes a set head, a threaded section having a thread, and a deformation section between the set head and the threaded section.

2. Discussion of Background Information

A blind rivet nut of the type generally discussed above is known, e.g., from EP 1 918 596 A1, the disclosure of which is expressly incorporated by reference herein in its entirety.

In the setting of a blind rivet nut, a threaded mandrel is usually screwed into the threaded section. The blind rivet nut is then inserted into a bore in a component. A pull is subsequently exerted on the threaded mandrel so that the threaded section moves towards the set head. The deformation section thereby forms a closing head so that the component is pinched between the set head and the closing head.

On blind rivet nuts embodied in a relatively simple manner, the deformation section has a size that is adapted to the thickness of the component in which the blind rivet nut is to be mounted. If the thickness of the component differs from the thickness for which the blind rivet nut is intended, there is the risk that the closing head is not formed properly.

Therefore, blind rivet nuts that have a weakening zone in the deformation section were suggested. An example of such a blind rivet nut can be found in the above-mentioned EP 1 918 596 A1. The deformation of the deformation section then begins in the weakening zone. In this manner, it is desired to be able to better control the formation of the closing head. However, the deformation section is mechanically weakened by the weakening zone, i.e., is made somewhat more unstable, so that there are certain risks with respect to the secure fastening of the blind rivet nut in a component.

SUMMARY OF THE INVENTION

Embodiments of the invention are directed to a rivet nut with a large clamping region and considerable fastening reliability.

Accordingly, a blind rivet nut of the type generally discussed at the outset includes a deformation section has at least one reinforcement region.

Thus, a weakening of the deformation section is omitted. Instead, the deformation section is embodied so that it can be reshaped outside the reinforcement region in precisely the same manner as in the case of a conventional single-region blind rivet nut, which is only intended for a particular thickness of a workpiece, and hinders the deformation in other regions of the deformation section in that this region or these regions are reinforced. In the reinforcement region, the deformation section has a higher deformation resistance than outside the reinforcement region. By way of a specific arrangement of the reinforcement region (or the reinforcement regions), it is thus possible to control the formation of the closing head in a targeted manner, i.e., even if the components in which the blind rivet nut is fastened have different material thicknesses.

Preferably, the reinforcement region has a work-hardened section of the deformation section. In a work hardening, the material of the deformation section is compressed. As a result, the deformation resistance increases, and the reinforcement region is formed.

Preferably, the reinforcement region has at least one interruption in a circumferential direction. This facilitates production. It is for example possible to produce the reinforcement area such that a mandrel is inserted into the inside of the deformation region and compression elements are applied radially from the outside which then affect the cold working. The use of multiple compression elements arranged distributed in a circumferential direction then results in axially running ridges remaining between the individual compression elements on the outside of the deformation section. In the ridges, no or only a slight work hardening has taken place.

Preferably, the deformation section has in at least one partial region of its circumference in the reinforcement region a wall thickness decreasing in the direction of the threaded section. Thus, regions compressed to a varying degree result in the reinforcement region. It will not necessarily be possible to assume that deformed material of the deformation section is only compressed during the cold working; rather, a certain displacement will also result to a small extent. However, the deformation behavior of the deformation section can be specifically controlled by the decreasing wall thickness.

Preferably, the wall strength of the reinforcement region at the end facing the threaded section is smaller than the largest wall thickness of the deformation section by 15% to 35%. A sufficient work hardening can thereby be achieved.

Preferably, the wall thickness decreases conically. Discontinuities in the material thickness are avoided which could lead to undesired results during the deformation of the deformation section.

Preferably, the reinforcement region is arranged in a region of the deformation section starting from the threaded section. In this way, the deformation section is reinforced against a deformation precisely at the location in which the deformation began in the case of conventional blind rivet nuts. The transition between the threaded section and the deformation section forms a type of joint or hinge on which the deformation section begins to arch outwards. If an increased deformation resistance is provided in this position, then the deformation section is forced to undergo deformation at a lesser distance from the set head so that the closing head begins to form as closely as possible to the side of the component facing away from the set head immediately at the outset of a setting procedure, in which component the blind rivet nut is to be fastened. It is thus possible to ensure that the closing head always fits very tightly on the component, independent of the thickness thereof.

Because the closing head is preferably formed moving away from the side of the set head facing the opposite direction, it is possible to produce a large closing head in such a manner. This is above all advantageous when the blind rivet nut is used in mixed structures. Because of the large contact surface of the closing head, the forces produced are distributed over this largest possible area. Damage to the component is thereby minimized.

Preferably, the threaded section has a thread axis and the reinforcement section has a deformation resistance varying along the thread axis. In particular, the deformation resistance should increase in the direction of the threaded section. When the blind rivet nut is set, the deformation section is deformed in the region of the smallest deformation resistance. During the formation described, this is always the region which is closest to the side of the component facing away from the set head. Accordingly, the closing head is always formed such that it tightly bears against this side of the component. If the component has a larger thickness, the location in which the closing head is formed will shift towards the threaded section.

Preferably, the deformation resistance is greatest in a region starting from the threaded section. Thus, the risk of the deformation section buckling at the transition in the direction of the threaded section is kept small.

Preferably, the reinforcement region has an axial length within the range of 35% to 65% of the axial length of the deformation section. The reinforcement region thus extends over at least one third, preferably up to a length of two thirds, of the deformation section. Although this makes the production of the blind rivet nut somewhat more complex, since the deformation section needs to be work-hardened over a greater length, better setting properties result.

Preferably, the deformation section is knurled on the outer circumference. The knurling, i.e., a grooving in an axial direction, is known per se for achieving a twist protection of the blind rivet nut in the component in which the blind rivet nut is fastened. In connection with the reinforcement region, the knurled embodiment has the additional advantage that the formation of the closing head can be even better controlled.

Embodiments of the invention are directed to a blind rivet nut with a rivet shank. The blind rivet nut includes a set head, a threaded section having a thread, and a deformation section, arranged between the set head and the threaded section, having at least one reinforcement region.

According to embodiments, the at least one reinforcement region can have a work-hardened section. Further, the at least one reinforcement region can have at least one interruption in a circumferential direction. The deformation section may have a circumference and in at least a partial region of the deformation section circumference in the reinforcement region, a wall thickness may decrease in a direction of the threaded section. The wall thickness of the reinforcement section at an end facing the threaded section can be smaller than a largest wall thickness of the deformation section by 15% to 35%. The wall thickness may decrease conically.

In accordance with other embodiments, the reinforcement region may be arranged in a region of the deformation section starting from the threaded section.

Further, the threaded section may have a thread axis and the reinforcement region can have a deformation resistance varying along the thread axis. The deformation resistance may be greatest in a region starting from the threaded section.

According to embodiments of the invention, the reinforcement region can have an axial length within the range of 35% to 65% of an axial length of the deformation section.

Moreover, the deformation section can be knurled on an outer circumference.

Embodiments of the invention are directed to a method of forming the blind rivet nut described above. The method includes work hardening at least one portion of the deformation section to form the reinforcement section.

According to embodiments, the work hardening may include inserting a mandrel into the deformation section and radially pressuring the at least one exterior portion of the deformation section. The reinforcement section can be formed adjacent the threaded section In accordance with still other embodiments, the method can include providing a web in the deformation section that is one of not work hardened or work hardened to a lesser extent than the at least one exterior portion. The may be structured so that a deformation resistance in the deformation section decreases from the threaded section to the set head.

According to embodiments of the invention, the method can also include knurling the deformation section to form a plurality of ridges and depressions extending in a longitudinal direction of the deformation section.

In embodiments, the method can also include decreasing a wall thickness in the deformation section from the set head to the threaded section.

Embodiments of the invention are directed to a method for forming a blind rivet nut with a rivet shank that includes a set head, a threaded portion and a deformation portion. The method includes forming at least one reinforcement region in the deformation portion adjacent the threaded portion having a deformation resistance that decreases from the threaded portion toward the set head.

In accordance with still yet other embodiments of the present invention, the forming at least one reinforcing region may include work hardening at least two portions of the deformation section separated by a web that is one of not work hardened or work hardened to a lesser extent than the at least two portions.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows a side view of a blind rivet nut;

FIG. 2 shows a section II-II according to FIG. 1; and

FIG. 3 shows a longitudinal section through the blind rivet nut according to FIG. 1.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

As illustrated in FIGS. 1-3, a blind rivet nut 1 has a rivet shank 2. Rivet shank 2 has a set head 3 at one end and a threaded section 4 at the other end. An internal thread 5 is embodied in threaded section 4. A deformation section 6 is provided between set head 3 and threaded section 4. As can be recognized in FIG. 3, the wall thickness of deformation section 6 is considerably smaller than the wall thickness of threaded section 4.

On its outer circumference, deformation section 6 is knurled, i.e., it has ridges 7 and depressions 8 distributed alternatingly in a circumferential direction which run respectively in an axial direction. In this regard, the term "axial"

refers to thread axis 9 of internal thread 5 which corresponds to a longitudinal axis of blind rivet nut 1.

Deformation section 6 has a reinforcement region 10 that connects to threaded section 4. It is formed by a work-hardened section of deformation section 6. Reinforcement region 10 can, as can be recognized in FIG. 1, be interrupted in a circumferential direction. Thus, between segments of reinforcement section 10 adjacent in a circumferential direction, a web 11 in which deformation section 6 is not or is less markedly work-hardened can indeed protrude radially.

Reinforcement region 10 is for example formed by inserting a mandrel into deformation section 6 and pressurizing deformation section 6 radially from the outside in reinforcement region 10 so that the material of rivet shank 2 is compressed and hardened in reinforcement region 10. Small material displacements are not detrimental here. A material that is work-hardened has a greater deformation resistance than the same material without work-hardening.

Deformation section 6 has a decreasing wall thickness in reinforcement region 10. Preferably, the wall thickness decreases conically, such that a cone angle a is only a few degrees. Adjoining threaded section 4, reinforcement region 10 has a thickness x which is less than a wall thickness y of deformation section 6 at set head 3 by, e.g., 15% to 35%, preferably by approximately 25%.

Reinforcement region 10 has a deformation resistance varying along thread axis 9. The deformation resistance is greatest in a region starting from threaded section 4. The deformation resistance thus decreases in the direction toward set head 3.

Blind rivet nut 1 can be inserted into a component, e.g., a plate, until set head 3 bears against a side of the plate. A pull can be exerted on threaded section 4, and then deformation section 6 will be deformed where the deformation resistance is the lowest, i.e., in the region of deformation section 6 closest to the component. Accordingly, the closing head will always be formed immediately adjoining the component, independent of the thickness of the component.

In this manner, it is possible to achieve a blind rivet nut 1 which has a clamping region in the order of magnitude of 0.5 to 8.5 mm, i.e., the component in which blind rivet nut 1 can be fastened can have a thickness within the range of 0.5 to 8.5 mm, without problems resulting during the formation of the closing head and during the secure fastening of blind rivet nut 1 in the component.

Accordingly, the knurling of deformation region 6 can produce a twist protection, while also facilitating deformation of deformation section 6 in the formation of the closing head.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A blind rivet nut with a rivet shank comprising:
   a set head;
   a threaded section having a thread; and
   a deformation section, arranged between the set head and the threaded section, having at least one reinforcement region,
   wherein the at least one reinforcement region has a work-hardened section, and
   wherein the at least one reinforcement region is arranged in a region of the deformation section starting from the threaded section.

2. The blind rivet nut according to claim 1, wherein the at least one reinforcement region has at least one interruption in a circumferential direction.

3. The blind rivet nut according to claim 1, wherein the deformation section has a circumference and in at least a partial region of the deformation section circumference in the at least one reinforcement region, a wall thickness decreases in a direction of the threaded section.

4. The blind rivet nut according to claim 3, wherein the wall thickness of the at least one reinforcement section at an end facing the threaded section is smaller than a largest wall thickness of the deformation section by 15% to 35%.

5. The blind rivet nut according to claim 3, wherein the wall thickness decreases conically.

6. The blind rivet nut according to claim 1, wherein the threaded section has a thread axis and the at least one reinforcement region has a deformation resistance varying along the thread axis.

7. The blind rivet nut according to claim 6, wherein the deformation resistance is greatest in a region starting from the threaded section.

8. The blind rivet nut according to claim 1, wherein the at least one reinforcement region has an axial length within the range of 35% to 65% of an axial length of the deformation section.

9. The blind rivet nut according to claim 1, wherein the deformation section is knurled on an outer circumference.

10. A method of forming the blind rivet nut according to claim 1, comprising:
    work hardening at least one portion of the deformation section to form the at least one reinforcement section.

11. The method according to claim 10, wherein the work hardening comprises:
    inserting a mandrel into the deformation section; and
    radially pressuring the at least one exterior portion of the deformation section.

12. The method according to claim 11, wherein the at least one reinforcement section is formed adjacent the threaded section.

13. The method according to claim 10, further comprising providing a web in the deformation section that is one of not work hardened or work hardened to a lesser extent than in the at least one exterior portion.

14. The method according to claim 13, wherein the web is structured so that a deformation resistance in the deformation section decreases from the threaded section to the set head.

15. The method according to claim 10, further comprising knurling the deformation section to form a plurality of ridges and depressions extending in a longitudinal direction of the deformation section.

16. The method according to claim 10, further comprising decreasing a wall thickness in the deformation section from the set head to the threaded section.

17. A method for forming a blind rivet nut with a rivet shank that includes a set head, a threaded section having a thread and a deformation section, arranged between the set head and the threaded section, the method comprising:
  forming at least one reinforcement region in the deformation section adjacent the threaded section having a deformation resistance that decreases from the threaded section toward the set head,
  wherein the forming of at least one reinforcing region comprises:
  work hardening at least two sections of the deformation section separated by a web that is one of not work hardened or work hardened to a lesser extent than the at least two sections.

18. A blind rivet nut with a rivet shank comprising:
  a set head;
  a threaded section having a thread; and
  a deformation section, arranged between the set head and the threaded section, having at least one reinforcement region,
  wherein the threaded section has a thread axis and the at least one reinforcement region has a work-hardened section and a deformation resistance, varying along the thread axis, that is greatest in a region starting from the threaded section.

* * * * *